United States Patent [19]

Hershberg et al.

[11] 3,889,191

[45] June 10, 1975

[54] GENERATOR FOR LOCAL OSCILLATOR SIGNALS

[75] Inventors: David E. Hershberg, Ridgewood; Arthur H. Chaplin, Wayne; Joseph E. Dewland, Secaucus, all of N.J.

[73] Assignee: International Telephone and Telegraph Corporation, Nutley, N.J.

[22] Filed: Oct. 12, 1973

[21] Appl. No.: 405,952

Related U.S. Application Data

[62] Division of Ser. No. 306,469, Nov. 14, 1972, Pat. No. 3,810,083.

[52] U.S. Cl. .................. 325/307; 331/60; 343/206

[51] Int. Cl. .................. H04b 7/08

[58] Field of Search .......... 331/49, 50, 60, 76, 46, 331/48, 19, 77; 325/301, 303, 307; 343/205, 206

[56] References Cited

UNITED STATES PATENTS

| | | | |
|---|---|---|---|
| 3,540,055 | 10/1970 | Takagi | 325/307 |
| 3,626,315 | 12/1971 | Stirling | 331/77 |
| 3,783,385 | 1/1974 | Dunn et al. | 325/307 X |

*Primary Examiner*—Benedict V. Safourek
*Attorney, Agent, or Firm*—John T. O'Halloran; Menotti J. Lombardi; Alfred C. Hill

[57] ABSTRACT

An arrangement is disclosed to provide a different local oscillator signal for each of N receivers contained in a communication station, where N is equal to an integer greater than one. Each of the receivers receive a different one of N communication frequency channels with adjacent ones of the N frequency channels being spaced from each other by a given frequency value. One embodiment incorporates a highly stable oscillator generating a signal having a frequency equal to the given frequency value. The oscillator output signal is then amplified to a high level and distributed to N multiplier/electrically controlled filter units. A different local oscillator signal is then selected for each of the receivers by an associated one of the electrically controlled filters. A second embodiment is identical to the first embodiment through the output of the N multipliers. In the second embodiment there is provided N units, each of which is coupled to a different one of the N multipliers. Each of these N units include N filters, each tuned to a different one of the required local oscillator signals, and N electrically controlled semiconductor switches. A different local oscillator signal is then selected for each of the receivers by a filter and a semiconductor switch of an associated one of the N units. A third embodiment includes the oscillator of the first and second embodiment, a multipliere coupled to the oscillator and one group of N filters of the second embodiment. The outputs of the N filters in this embodiment is fed to a semiconductor NxN matrix. The matrix is controlled to route each of the different local oscillator signals to a different associated one of the N receivers.

4 Claims, 3 Drawing Figures

GENERATOR FOR LOCAL OSCILLATOR SIGNALS

CROSS-REFERENCE TO RELATED APPLICATIONS

This is a division of application Ser. No. 306,469 filed Nov. 14, 1972, now U.S. Pat. No. 3,810,083.

BACKGROUND OF THE INVENTION

This invention relates to a local oscillator signal source and more particularly to an arrangement to provide a different local oscillator signal for each of a plurality of receivers contained in a station, such as a communication station, where each of the receivers receive a different frequency channel with adjacent ones of the frequency channels being spaced from each other by a given frequency value.

The description to follow will be directed to a communication station and more particularly to a ground station for a satellite communication system. However, it is to be remembered that the techniques described herein are not limited to such ground stations, but may be incorporated in any station, such a line of sight frequency multiplex communication station, a station receiving a plurality of navigation signals on a plurality of frequency channels, or the like.

In prior art arrangements each receiver contained in a communication station responding to a different frequency channel station required a separate highly stable oscillator, or an oscillator arrangement that required tuning to provide the desired local oscillator signal for each of the receivers and to maintain the desired frequency spacing between adjacent frequency channels. This can become cumbersome, expensive and require an undue amount of manual tuning to achieve the down conversion of the signals of the frequency channels to a given intermediate frequency and to maintain the desired frequency spacing between the adjacent ones of the frequency channels.

SUMMARY OF THE INVENTION

An object of the present invention is to provide an arrangement to provide a different local oscillator signal for each of a plurality of receivers contained in a communication station, where each of the receivers receive a different one of a plurality of frequency channels with adjacent ones of the frequency channels being spaced from each other by a given frequency value, where the different local oscillator signals are obtained by electrical switching with no tuning required, and which is simple, inexpensive and provides the desired frequency channel spacing.

A feature of the present invention is the provision of an arrangement to provide a different local oscillator signal for each of N receivers contained in a station, where N is equal to an integer greater than one, each of the N receivers receiving a different one of N frequency channels, adjacent ones of the N frequency channels being spaced from each other by a given frequency value, the arrangement comprising: a highly stable oscillator generating a signal having a frequency equal to the given frequency value; at least one first means to generate N signals, each of the N signals having a different frequency related to the given frequency value, adjacent ones of the different frequencies being spaced by the given frequency value; and at least one second means to select the appropriate one of the N signals to provide at least one local oscillator signal for an associated one of the N receivers.

Another feature of the present invention is the provision of an arrangement as defined above wherein the first means includes an amplifier coupled to the oscillator, and a frequency multiplier coupled to the amplifier, the multiplier being rich in harmonics of the given frequency value to generate the N signals.

Still another feature of the present invention is the provision of an arrangement as defined above wherein the second means includes an electrically controlled filter means coupled to the multiplier, and third means coupled to the controlled filter means capable of controlling the controlled filter means to pass different ones of the N signals independent of each other, the third means selecting the appropriate one of the N signals.

A further feature of the present invention is the provision of an arrangement as defined above wherein the second means includes N filters coupled to the multiplier, each of the N filters being tuned to a different one of the N signals, N switch means, each of the N switch means being coupled to a different one of the N filters, third means coupled to the N switch means for control thereof to select the appropriate one of the N signals and fourth means coupled to the N switch means to couple the selected appropriate one of the N signals to the associated one of the N receivers.

Still a feature of the present invention is the provision of an arrangement as described above wherein the second means includes N filters coupled to the multiplier, each of the N filters being tuned to a different one of the N signals, an NxN matrix coupled to the N filters, and third means coupled to the matrix for control thereof to provide a different local oscillator signal for each of the N receivers.

Above-mentioned and other features and objects of this invention will become more apparent by reference to the following description taken in conjunction with the accompanying drawing in which:

FIG. 1 is a block diagram of one embodiment of an arrangement to provide different local oscillator signals for each of a plurality of receivers in accordance with the principles of the present invention;

FIG. 2 is a block diagram of a second embodiment of an arrangement to provide a different local oscillator signal for each of a plurality of receivers in accordance with the principles of the present invention; and FIG. 3 is a block diagram of a third embodiment of an arrangement to provide a different oscillator signal for each of a plurality of receivers in accordance with the principles of the present invention.

DESCRIPTION OF THE PREFERRED EMBODIMENTS

Figure 1:
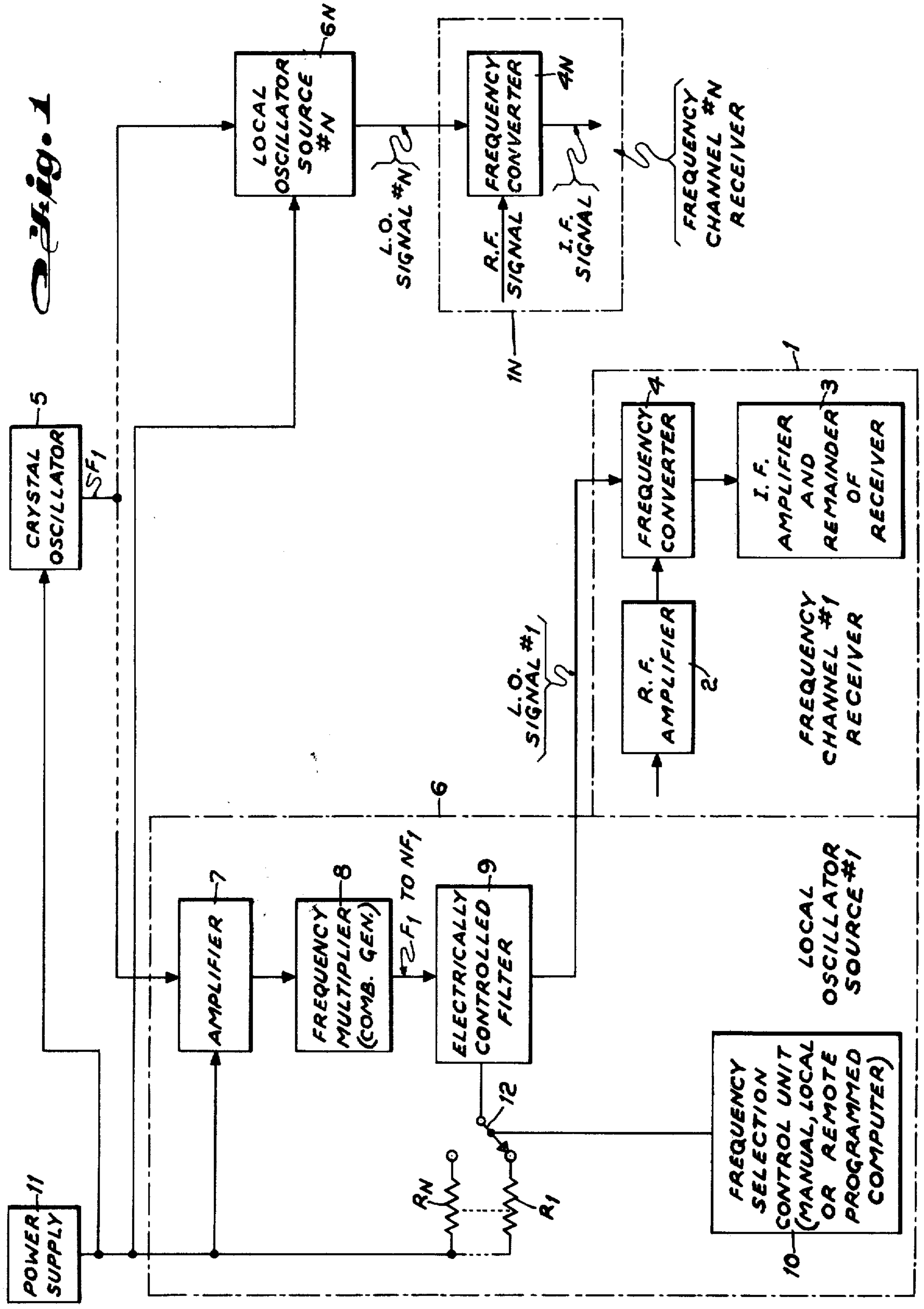

Referring to FIG. 1, there is disclosed therein in block diagram form one embodiment of an arrangement to provide a different local oscillator signal for each of N receivers 1-1N contained in a communication station, where N is equal to an integer greater than one. Each of the receivers 1-1N receive a different one of N frequency channels with adjacent ones of the frequency channels being spaced from each other by a given frequency value, such as, for example, 40 MHz (megahertz).

The receivers 1-1N are conventional receivers, such as employed in a satellite communication system ground station, each of which receives communication signals in a different frequency channel. As illustrated in FIG. 1 there is required a frequency or down converter 4 for converting the RF (radio frequency) signal in RF amplifier 2 to a IF (intermediate frequency) signal for use in the IF amplifier and remainder of the receiver 3. Frequency or down converter 4 receives a locally generated local oscillator signal to provide the desired down conversion.

In accordance with the principles of the present invention the arrangement for providing the different local oscillator signal No. 1 to No. N is provided by employing a common highly stable oscillator, such as crystal oscillator 5, having an output signal whose frequency is equal to $F_1$, which in the example employed herein is 40 MHz. The output signal of oscillator 5 is distributed to N local oscillator sources $6$–$6_N$. Each of the sources $6$–$6_N$ include an amplifier 7 to amplify the output of oscillator 5 to a high level. The output of amplifier 7 is then coupled to a frequency multiplier (comb generator) 8. Multiplier 8 is rich in harmonics of frequency $F_1$ and produces a comb of frequencies $F_1$ to $NF_1$ at its output with each of the adjacent frequencies at the output of multiplier 8 being spaced by a frequency value equal to $F_1$, which in the example employed herein is 40 MHz. The comb of frequencies at the output of multiplier 8 is then coupled to electrically controlled filter 9 which is controlled from frequency selection control unit 10 select the desired local oscillator signal needed for the associated frequency channel receiver. Filter 9 may include a YIG (yttrium indium garnet) element. This YIG element contained in filter 9 is adjusted to cause the filter to respond independently to signals, each of which have a frequency equal to a different one of the frequencies in the comb of frequencies at the output of multiplier 8. The adjustment of the YIG element is accomplished by means of different values of current supplied to the YIG element from a power supply 11 and resistors $R_1$–$R_N$, each of which have a different resistive value to provide the different current values to cause filter 9 to respond independently to the N signals having frequencies equal to different ones of individual frequencies $F_1$ to $NF_1$ at the output of multiplier 8. Control unit 10 operates switch 12 manually or switch 12 is a semiconductor type switch which is controlled through means of a local or remote programmed computer to enable the selection of the desired local oscillator signal to be employed in the frequency or down converter of the associated one of receivers 1–1N.

It should be noted that the power supply 11 also supplies the operating voltage for oscillator 5 and amplifiers 7 in the arrangement of FIG. 1.

Figure 2:
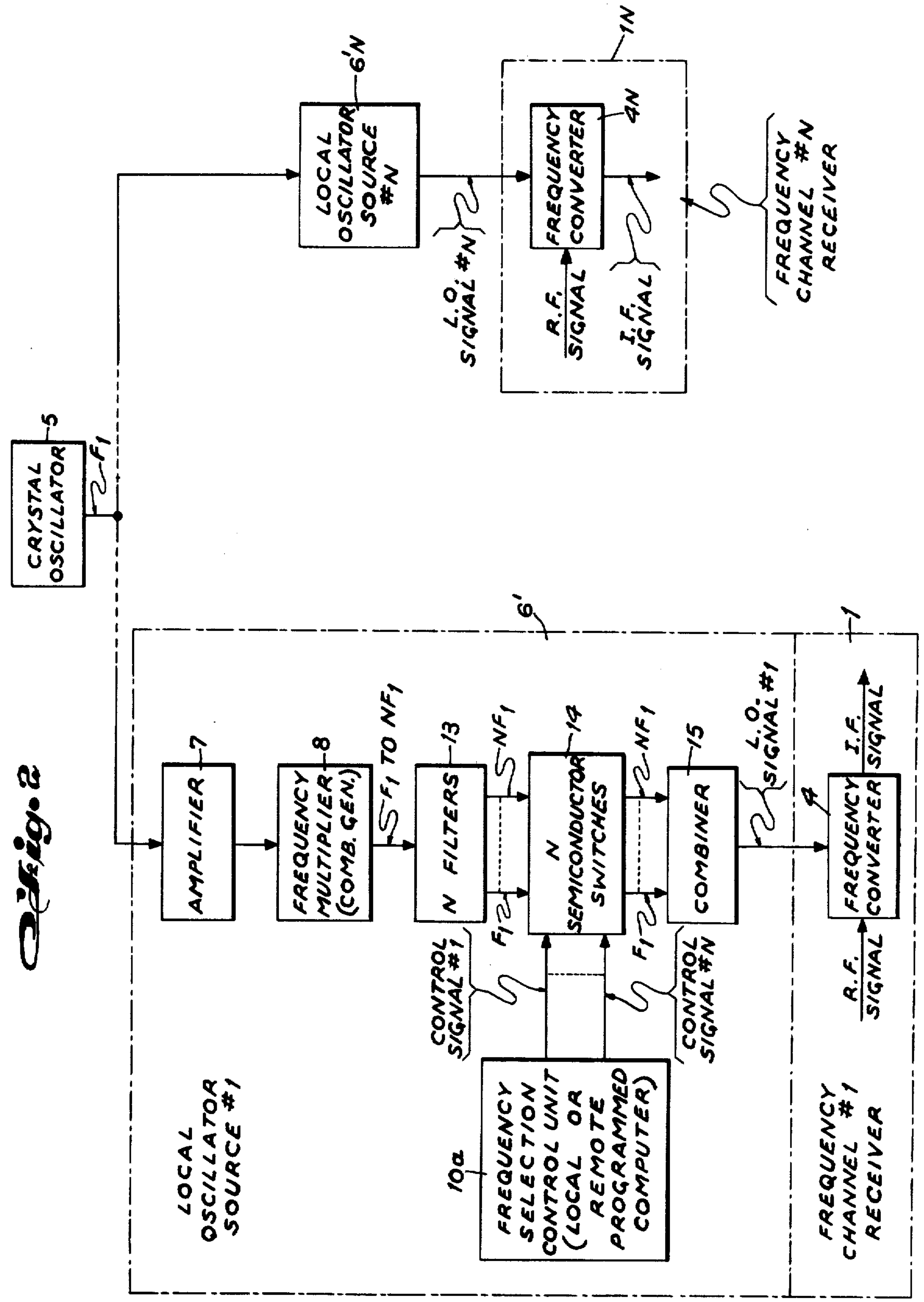

Referring to FIG. 2, there is disclosed therein a second embodiment of the arrangement in accordance with the principles of the present invention. As in FIG. 1, the arrangement in accordance with the principles of the present invention provides the different local oscillator signals for each of the receivers 1–1N with the associated local oscillator signals being employed in frequency or down converters 4–4N of the receivers 1–1N.

The arrangement of FIG. 2 includes N local oscillator sources $6^1$ to $6^1N$ each of which is driven from crystal oscillator 5 as in the case of the arrangement of FIG. 1. The output signal of oscillator 5 has a frequency equal to $F_1$, which in the example employed herein is 40 MHz. Each of the local oscillator sources include, as in FIG. 1, an amplifier 7 and a frequency multiplier 8 which provide at the output thereof a comb of frequencies $F_1$ to $NF_1$ thereby providing the necessary N signals as in the case of FIG. 1.

The output of multiplier 8 in the arrangement of FIG. 2 is coupled to N filters 13 each of which is tuned to a different one of the frequencies $F_1$ to $NF_1$. The output of each of the filters 13 include therein one of N semiconductor switches 14. Switches 14 are controlled by frequency selection control unit $10a$ which provides N control signals through means of a local or remote programmed computer, or the like so that all of the switches 14 will be turned off with the exception of the switch connected in the output of a filter of filters 17 containing the local oscillator signal having the desired frequency value for the associated one of frequency converters 4. The signal output of switches 14 are coupled to the associated one of frequency converters 4 through means of combiner 15. Combiner 15 behaves like an OR gate. This is, combiner 15 will pass only one of any one of the signals passed through switches 14 to the associated one of frequency converters 4.

Figure 3:
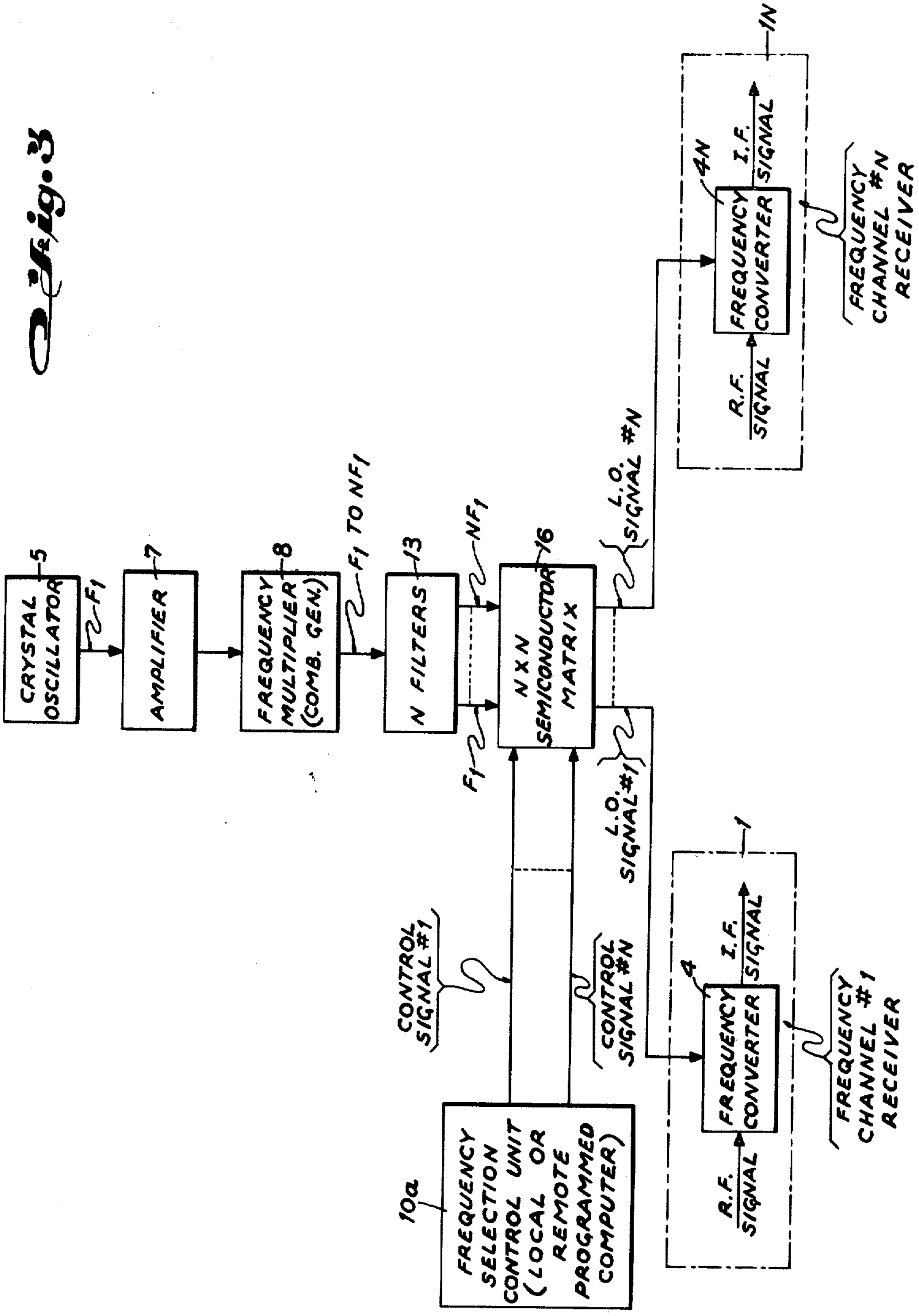

Referring to FIG. 3, there is illustrated therein a third embodiment of the arrangement according to the principles of the present invention which supplies a different one of N local oscillator signals to an associated one of N frequency converters 4–4N contained in N receivers 1–1N.

In the arrangement of FIG. 3, the arrangement is identical to one of the local oscillator sources of FIG. 2 in that it includes crystal oscillator 5, amplifier 7, frequency multiplier 8 and N filters 13. The operation of these circuits 5, 7, 8 and 13 are as described hereinabove with respect to FIG. 2.

Rather than coupling the output signal of each filter of filters 13 under control of a semiconductor switch, the output signal of each filter of filters 13 is coupled to a N × N semiconductor matrix 16 which is controlled by N control signals produced in frequency selection control unit $10a$. As in FIGS. 1 and 2 control circuit $10a$ may be in the form of a local or remote programmed computer. Matrix 16 will route each of the N local oscillator signals to an associated one of converters 4–4N contained in an associated one of receivers 1–1N.

The advantage of the arrangement of FIG. 3 is that only one local oscillator source is required per station rather than the N local oscillator sources employed in the embodiments of FIGS. 1 and 2.

While we have described above the principles of our invention in connection with specific apparatus it is to be clearly understood that this description is made only by way of example and not as a limitation to the scope of our invention as set forth in the objects thereof and in the accompanying claims.

We claim:

1. An arrangement to provide a different local oscillator signal for each of N receivers contained in a station, where N is equal to an integer greater than one, each of said N receivers receiving a different one of N frequency channels, adjacent ones of said N frequency channels being spaced from each other by a given frequency value, said arrangement comprising:

a highly stable oscillator having an output to provide a signal having a frequency equal to said given frequency value;

first means having an output and an input coupled to the output of said oscillator, said first means generating N signals, each of said N signals having a different frequency related to said given frequency value, adjacent ones of said different frequencies being spaced by said given frequency value;

N filters each having an output and an input coupled to the output of said first means, each of said N filters being tuned to a different one of said N signals;

an N × N matrix having N outputs each coupled to a different one of said N receivers, N signal inputs each coupled to the output of a different one of said N filters and N control inputs; and second means having N outputs each coupled to a different one of the N control inputs of said matrix for control thereof to provide simultaneously a different local oscillator signal for each of said N receivers.

2. An arrangement according to claim 1, wherein said matrix includes an N × N semiconductor matrix.

3. An arrangement according to claim 1, wherein said first means includes an amplifier having an output and an input coupled to the output of said oscillator, and a frequency multiplier having an input coupled to the output of said amplifier and an output coupled to the input of each of said N filters, said multiplier being rich in harmonics of said given frequency value to generate said N signals.

4. An arrangement according to claim 3, wherein said matrix includes an N × N semiconductor matrix.

* * * * *